(12) United States Patent
Asano et al.

(10) Patent No.: US 9,780,407 B2
(45) Date of Patent: *Oct. 3, 2017

(54) ALL-SOLID LITHIUM SECONDARY BATTERY

(71) Applicant: Panasonic Intellectual Property Management Co., Ltd., Osaka (JP)

(72) Inventors: Tetsuya Asano, Kyoto (JP); Tomoyuki Komori, Osaka (JP); Eiji Fujii, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 251 days.

This patent is subject to a terminal disclaimer.

(21) Appl. No.: 14/699,711

(22) Filed: Apr. 29, 2015

(65) Prior Publication Data

US 2015/0236374 A1 Aug. 20, 2015

Related U.S. Application Data

(63) Continuation of application No. PCT/JP2014/003275, filed on Jun. 18, 2014.

(30) Foreign Application Priority Data

Aug. 29, 2013 (JP) .................................. 2013-177674

(51) Int. Cl.
*H01M 10/0562* (2010.01)
*H01M 4/66* (2006.01)
(Continued)

(52) U.S. Cl.
CPC ....... *H01M 10/0562* (2013.01); *H01M 4/664* (2013.01); *H01M 10/0525* (2013.01);
(Continued)

(58) Field of Classification Search
None
See application file for complete search history.

(56) References Cited

U.S. PATENT DOCUMENTS

2012/0015251 A1  1/2012  Oki
2012/0237835 A1* 9/2012  Yada ............... H01B 1/122
                                                            429/320

(Continued)

FOREIGN PATENT DOCUMENTS

JP  2003-132887 A  5/2003
JP  2007-101536 A  4/2007

(Continued)

OTHER PUBLICATIONS

H. Katsui et al., "Epitaxial growth of (104)- and (018)-oriented LiCoO2 films on MgO single crystals prepared by chemical vapor deposition," Surface & Coatings Technology, vol. 218, Mar. 15, 2013, pp. 57-61.

(Continued)

*Primary Examiner* — Jeremiah Smith
(74) *Attorney, Agent, or Firm* — McDermott Will & Emery LLP

(57) ABSTRACT

An exemplary all-solid lithium secondary battery includes a positive electrode including a positive-electrode active substance layer, a negative electrode, and a solid electrolyte layer interposed between the positive electrode and the negative electrode. The positive-electrode active substance layer is composed of lithium cobaltate, and has an α-NaFeO$_2$ type crystal structure. The positive-electrode active substance layer has a (018) plane oriented in a normal direction of a principal face of the positive-electrode active substance layer. The solid electrolyte layer is composed of lithium lanthanum titanate and has a tetragonal perovskite-type crystal structure. The solid electrolyte layer has a (110)

(Continued)

plane or a (102) plane oriented in a normal direction of a principal face of the solid electrolyte layer.

11 Claims, 6 Drawing Sheets

(51) Int. Cl.
*H01M 10/0525* (2010.01)
*H01M 4/02* (2006.01)
*H01M 10/052* (2010.01)

(52) U.S. Cl.
CPC .......... *H01M 4/66* (2013.01); *H01M 10/052* (2013.01); *H01M 2004/028* (2013.01); *H01M 2300/0071* (2013.01); *Y02T 10/7011* (2013.01)

(56) References Cited

U.S. PATENT DOCUMENTS

| 2013/0045424 | A1* | 2/2013 | Sugiura | C01G 45/1228 429/231.8 |
|---|---|---|---|---|
| 2014/0308590 | A1* | 10/2014 | Ohta | H01B 1/122 429/403 |
| 2015/0236374 | A1* | 8/2015 | Asano | H01M 10/0562 429/322 |

FOREIGN PATENT DOCUMENTS

| JP | 2009-181871 A | 8/2009 |
|---|---|---|
| JP | 2009-215130 A | 9/2009 |
| JP | 2009-295514 A | 12/2009 |
| JP | 2012-099405 A | 5/2012 |
| JP | 2013-134812 A | 7/2013 |
| WO | 2011/007412 A1 | 1/2011 |
| WO | 2011/128976 A1 | 10/2011 |

OTHER PUBLICATIONS

M. Hirayama et al., "Characterization of electrode/electrolyte interface for lithium batteries using in situ synchrotron X-ray reflectometry—A new experimental technique for LiCoO2 model electrode," Journal of Power Sources, vol. 168, Jun. 1, 2007, pp. 493-500.

International Search Report issued in International Application No. PCT/JP2014/003275 dated Sep. 9, 2014, with English translation.
Co-pending U.S. Appl. No. 14/700,085, filed Apr. 29, 2015.

* cited by examiner

ALL-SOLID LITHIUM SECONDARY BATTERY

This is a continuation of International Application No. PCT/JP2014/003275, with an international filing date of Jun. 18, 2014, which claims priority of Japanese Patent Application No. 2013-177674, filed on Aug. 29, 2013, the contents of which are hereby incorporated by reference.

BACKGROUND

1. Technical Field

The present application relates to an all-solid lithium secondary battery.

2. Description of the Related Art

An all-solid lithium secondary battery in which a solid material is used as the electrolyte is naturally safer than conventional lithium secondary batteries in which a combustible liquid electrolyte is used, and can attain high energy density. Therefore, in recent years, research and development of all-solid lithium secondary batteries is being actively conducted.

An all-solid lithium secondary battery includes a positive-electrode active substance layer and a negative-electrode active substance layer, and a solid electrolyte layer interposed between these active substance layers. The positive-electrode active substance layer and the negative-electrode active substance layer both contain an active substance which is capable of occlusion and release of lithium ions. In an all-solid lithium secondary battery, with oxidation/reduction of the positive electrode and the negative electrode, lithium ions migrate in the solid electrolyte layer between the positive-electrode active substance layer and the negative-electrode active substance layer, whereby the lithium secondary battery can be charged or discharged.

For example, International Publication No. 2011/128976 (hereinafter "Patent Document 1") discloses an all-solid lithium secondary battery in which polycrystalline lithium lanthanum titanate is used as the solid electrolyte.

SUMMARY

The inventors have found that, with conventional all-solid lithium secondary battery, it is difficult to reconcile excellent charge-discharge cycle characteristics and high output characteristics. This will be detailed later.

One illustrative embodiment of the present disclosure provides a novel solid lithium secondary battery having high charge-discharge cycle characteristics and high output characteristics.

An all-solid lithium secondary battery according to an embodiment of the present application comprises: a positive electrode including a positive-electrode active substance layer; a negative electrode including a negative-electrode active substance layer, the negative-electrode active substance layer allowing lithium ions to be inserted and allowing inserted lithium ions to be released; and a solid electrolyte layer interposed between the positive electrode and the negative electrode, wherein, the positive-electrode active substance layer includes lithium cobaltate, and has an $\alpha$-$NaFeO_2$ type crystal structure; the positive-electrode active substance layer has a (018) plane oriented in a normal direction of a principal face of the positive-electrode active substance layer; the solid electrolyte layer includes lithium lanthanum titanate and has a tetragonal perovskite-type crystal structure; and the solid electrolyte layer has a (110) plane or a (102) plane oriented in a normal direction of a principal face of the solid electrolyte layer.

A solid lithium secondary battery according to an embodiment of the present disclosure has high charge-discharge cycle characteristics and high output characteristics.

Specifically, the positive-electrode active substance layer of lithium cobaltate has the (018) plane oriented in the normal direction of the principal face of the positive-electrode active substance layer, or includes first regions and second regions which are mixedly present. The first regions have the (018) plane oriented in the normal direction of the principal face of the positive-electrode active substance layer and the second regions have the (110) plane oriented in the normal direction of the principal face of the positive-electrode active substance layer. As a result, expansion stress acting in a plane which is parallel to the principal face of the positive-electrode active substance layer is suppressed. Therefore, at the interface between the positive-electrode active substance layer and the solid electrolyte layer, deteriorations in strength of adherence due to repeated charge/discharge cycles can be suppressed. Thus, deteriorations in charge-discharge cycle characteristics due to peeling of the solid electrolyte layer can be suppressed.

Moreover, because of the aforementioned orientation of the positive-electrode active substance layer, the diffusion distance of lithium in the positive-electrode active substance layer can be reduced. Furthermore, the solid electrolyte layer of lithium lanthanum titanate has the (110) plane or the (102) plane oriented in the normal direction of the principal face of solid electrolyte layer, so that deteriorations in lithium conductivity associated with crystal grain boundaries can be suppressed. Thus, it is possible to ensure sufficient output characteristics.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Figure 1:
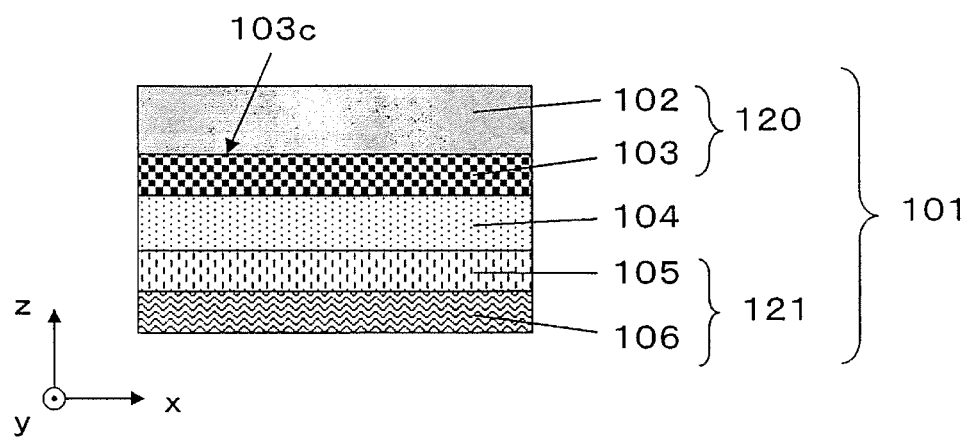
FIG. 1 is a cross-sectional view illustrating an exemplary first embodiment of an all-solid lithium secondary battery according to the present disclosure.

The inventors have found a problem in that, in a conventional all-solid lithium secondary battery in which lithium cobaltate is used as the positive-electrode active substance, it is difficult to suppress deteriorations in cycle characteristics that are caused by expansion and contraction of the active substance due to charging and discharging, while ensuring high output power. Hereinafter, the problem which the inventors have found through their studies will be described in detail.

A crystal of lithium cobaltate has a laminar rock salt structure, in which layers of cobalt oxide and layers of lithium are alternately stacked. Lithium ions are likely to migrate along these layers. In other words, when crystalline lithium cobaltate is used as the positive-electrode active substance layer, the lithium cobaltate crystal may be disposed so that each layer in the laminar rock salt structure extends perpendicular to the principal face (i.e., so as to have the (110) plane oriented in the normal direction of the principal face), whereby it becomes easy to effect insertion/release of lithium ions to/from the lithium cobaltate, thus presumably enhancing the output power of the lithium secondary battery. For example, Non-Patent Document 1 (Surface & Coatings Technology 218 (2013) 57-61) and Non-Patent Document 2 (Journal of Power Sources 168 (2007) 493-500) show discussions of the relationship between the crystal orientation of lithium cobaltate and output characteristics.

In the above case, with insertion/release of lithium ions, the positive-electrode active substance layer repeats expansion and contraction in a parallel direction to the principal face of the positive electrode. When this positive-electrode active substance layer is placed on the surface of a solid electrolyte layer to construct a secondary battery, the strength of adherence between the positive-electrode active substance layer and the solid electrolyte layer will be deteriorated with repeated charging and discharging, possibly causing the solid electrolyte layer to peel off the positive-electrode active substance layer. This may deteriorate the charge-discharge cycle characteristics.

Moreover, when the lithium cobaltate crystal is disposed so that each layer in the laminar rock salt structure extends parallel to the principal face (i.e., so as to have a (003) plane oriented in the normal direction of the principal face), the directions of expansion/contraction of the positive-electrode active substance layer will be perpendicular to the principal face of the positive electrode. Furthermore, even when a polycrystalline film is used as the positive-electrode active substance layer, expansion/contraction occurring in a plane which is parallel to the principal face of the positive-electrode active substance layer is reduced, whereby peeling of the solid electrolyte layer can be suppressed. Therefore, presumably deteriorations in the adherence between the positive-electrode active substance layer and the solid electrolyte layer will be reduced. However, if a positive-electrode active substance layer which has the (003) plane oriented in the normal direction of the principal face or a polycrystalline positive-electrode active substance layer is used, lithium ion exchange will not smoothly occur, so that high output power may not be obtained.

Thus, there is a tradeoff relationship between charge-discharge cycle characteristics and output characteristics, which makes it difficult to simultaneously attain these characteristics.

In order to solve the above problems, the inventors have first studied positive-electrode active substance layers and solid electrolyte layers that may enhance output characteristics. As a result, it has been found that enhancing the crystallinity of these layer will improve output characteristics. Specifically, higher output power can be realized by, in descending order of output power, amorphous, polycrystalline, and single crystal. It has also been found that, not only by adopting single crystal films for the positive-electrode active substance layer and the solid electrolyte layer, but also by controlling the orientation of the plane of lithium diffusion in such single crystal films, it is possible to attain further improvements in output characteristics.

For example, in order to obtain a positive-electrode active substance layer and a solid electrolyte layer that are single crystal films, these layers could be formed by epitaxial growth. As is described in Non-Patent Document 2, in particular, an epitaxial film which is oriented in the (110) plane may be adopted for the positive-electrode active substance layer (lithium cobaltate), whereby lithium ions will become more likely to diffuse between the positive electrode and the negative electrode. When a solid electrolyte layer (lithium lanthanum titanate) is epitaxially grown on such a positive-electrode active substance layer, an epitaxial film which is oriented in the (110) plane will be obtained due to the influence of the underlying crystal structure.

However, when a positive-electrode active substance layer which is oriented in the (110) plane and a solid electrolyte layer which is oriented in the (110) plane are stacked, the positive-electrode active substance layer will undergo significant expansion/contraction within the plane through charging and discharging. As described earlier, this will detract from adherence between the positive-electrode active substance layer and the solid electrolyte layer, possibly causing deteriorations in charge-discharge cycle characteristics.

Through studies by the inventors, it has been found that lithium cobaltate which is oriented in the (018) plane allows for easy insertion and release of lithium ions, and reduces the in-plane components of expansion/contraction through charging and discharging. This has led to the inventors' finding that reconciliation between high output power and high charge-discharge cycle characteristics can be achieved by using thus-oriented lithium cobaltate as the positive-electrode active substance layer, and forming thereupon a solid electrolyte layer which is oriented in the (110) plane or the (102) plane.

Conventionally, a crystal structure which is oriented in the (018) plane has never been used as a positive-electrode active substance layer, and the advantages coming from the use thereof have not been previously recognized. The aforementioned findings concerning the crystal orientation of lithium cobaltate were boldly made by the inventors by disregarding conventional technological knowledge.

Generally speaking, a solid electrolyte layer which is oriented in the (110) plane (e.g., an epitaxial film) is to be formed over an underlying region which is oriented in the (110) plane. There has never existed a concept of forming (e.g., epitaxially growing) a solid electrolyte layer which is oriented in the (110) plane over an underlying layer of positive-electrode active substance which is oriented in the (018) plane. The inventors have arrived at the finding that, again by disregarding conventional technological knowledge, it is actually possible to form a solid electrolyte layer which is oriented in the (110) plane or the (102) plane over a positive-electrode active substance layer that includes a region which is oriented in the (018) plane.

Based on the above finding, the inventors have found a novel electrode structure that can provide improved charge-discharge cycle characteristics while ensuring high output power, thus arriving at the present disclosure.

An all-solid lithium secondary battery according to an embodiment of the present application is as follows.

An all-solid lithium secondary battery according to an embodiment of the present application comprises: a positive electrode including a positive-electrode active substance layer; a negative electrode including a negative-electrode active substance layer, the negative-electrode active substance layer allowing lithium ions to be inserted and allowing inserted lithium ions to be released; and a solid electrolyte layer interposed between the positive electrode and the negative electrode, wherein, the positive-electrode active substance layer includes lithium cobaltate, and has an α-NaFeO$_2$ type crystal structure; the positive-electrode active substance layer is oriented in the (018) plane; the solid electrolyte layer includes lithium lanthanum titanate and has a tetragonal perovskite-type crystal structure; and the solid electrolyte layer is oriented in the (110) plane or the (102) plane.

The positive-electrode active substance layer and the solid electrolyte layer may be epitaxial films.

The solid electrolyte layer may be an epitaxial film that matches a crystal orientation of the positive-electrode active substance layer.

A [−4-81] direction in the positive-electrode active substance layer may be parallel to a [001] direction or a [010] direction in the solid electrolyte layer, and a [100] direction in the positive-electrode active substance layer may be parallel to a [1-10] direction or a [−201] direction in the solid electrolyte layer.

In an X-ray diffraction pattern of the positive-electrode active substance layer, a ratio (I(018)/I(003)) between a peak intensity I(018) of the (018) plane and a peak intensity I(003) of the (003) plane may satisfy the relationship I(018)/I(003)>20.

An all-solid lithium secondary battery according to another embodiment of the present application comprises: a positive electrode including a positive-electrode active substance layer; a negative electrode including a negative-electrode active substance layer, the negative-electrode active substance layer allowing lithium ions to be inserted and allowing inserted lithium ions to be released; a solid electrolyte layer interposed between the positive electrode and the negative electrode, wherein, the positive-electrode active substance layer includes lithium cobaltate, and has an α-NaFeO$_2$ type crystal structure; given an x axis and a y axis which are defined as two axes that are parallel to a principal face of the positive-electrode active substance layer, and a z axis which is defined as an axis that is perpendicular to the principal face, the positive-electrode active substance layer is composed only of first regions oriented in the (110) plane and second regions oriented in the (018) plane, the first regions and second regions being mixedly present in an xy plane of the positive-electrode active substance layer; the solid electrolyte layer includes lithium lanthanum titanate and has a tetragonal perovskite-type crystal structure; and the solid electrolyte layer is oriented in the (110) plane or the (102) plane.

The positive-electrode active substance layer and the solid electrolyte layer may be epitaxial films.

The solid electrolyte layer may be an epitaxial film that matches a crystal orientation of the positive-electrode active substance layer.

In an X-ray diffraction pattern of the positive-electrode active substance layer, a ratio (I(110)/I(018)) between a peak intensity I(110) of the (110) plane and a peak intensity I(018) of the (018) plane may satisfy the relationship 0.3≤I(110)/I(018)≤1.

In the positive-electrode active substance layer, there may be no overlap between the first regions and the second regions along the z axis direction.

The positive-electrode active substance layer may be formed on a current collector which is a strontium titanate substrate, the strontium titanate substrate being doped with a dopant and electrically conductive.

First Embodiment

With reference to the drawings, an all-solid lithium secondary battery according to a first embodiment of the present disclosure will be described.

FIG. 1 is a schematic cross-sectional view of an all-solid lithium secondary battery 101 according to the present embodiment.

The all-solid lithium secondary battery 101 includes a positive electrode 120, a negative electrode 121, and a solid electrolyte layer 104 interposed between the positive electrode 120 and the negative electrode 121.

The positive electrode 120 includes a positive-electrode current collector 102 and a positive-electrode active substance layer 103. The positive-electrode active substance layer 103 is in contact with the positive-electrode current collector 102, and connected in electrical series to the positive-electrode current collector 102. Similarly, the negative electrode 121 includes a negative-electrode current collector 106 and a negative-electrode active substance layer 105. The negative-electrode active substance layer 105 is in contact with the negative-electrode current collector 106, and connected in electrical series to the negative-electrode current collector 106. The solid electrolyte layer 104 is interposed between and in contact with the positive-electrode active substance layer 103 and the negative-electrode active substance layer 105.

Hereinafter, the constituent elements will be described in detail.

(Positive-Electrode Active Substance Layer 103)

In the following description, the z axis is defined in a direction perpendicular to a principal face 103c of the positive-electrode active substance layer 103, whereas the x axis and the y axis are defined as two orthogonal axes which lie in the principal face of the positive-electrode active substance layer 103.

The positive-electrode active substance layer 103 is composed of a hexagonal material of lithium cobaltate (LiCoO$_2$). More specifically, lithium cobaltate has an α-NaFeO$_2$ type crystal structure. Moreover, the positive-electrode active substance layer 103 may be of any composition other than the aforementioned composition, so long as it has an α-NaFeO$_2$ type crystal structure and is capable of lithium insertion and release. For example, some of the Co sites in lithium cobaltate may be substituted by other metals, e.g., Ni. In other words, it may be of a composition expressed as LiCo$_{1-x}$M$_x$O$_2$ (0≤x<1, M is one or more elements selected from among Ni, Mn, and Al). So long as the Li/Co composition ratio in a discharged state is within the range of 0.9 to 1.1, the composition ratio between Li and the metal oxide does not need to be 1:1. Moreover, x can be set within a range such that the $NaFeO_2$ crystal structure is not lost; for example, $0 \leq x < 0.66$. Note that, the positive-electrode active substance layer 103 may contain impurities so long as it contains lithium cobaltate of the aforementioned composition as the main component.

The positive-electrode active substance layer 103 has the (018) plane oriented in the z axis direction, i.e., the positive-electrode active substance layer 103 is oriented in the (018) plane with respect to the z axis direction. Note that a plane orientation generally refers to an orientation relative to the normal direction of the principal face of a given layer, and thus the expression "in the z axis direction" or "with respect to the z axis direction" may occasionally be omitted in the following description.

The positive-electrode active substance layer 103 may be composed only of a crystalline region which is oriented in the (018) plane; as a result, expansion/contraction of the positive-electrode active substance layer 103 can be suppressed more effectively. As used herein, to be "composed only of a region which is composed only of a region which is oriented in the (018) plane" means that, when the positive-electrode active substance layer 103 is subjected to X-ray diffraction intensity measurement, an integral value of the peaks associated with any crystal oriented in the (018) plane accounts for 95% or more of an integral value of all diffraction peaks.

The positive-electrode active substance layer 103 may include a region which is oriented in any plane other than the (018) plane, for example. For instance, a region which is oriented in the (003) plane may be included. In this case, the ratio (I(018)/I(003)) between peak intensity I(018) of the (018) plane of the positive-electrode active substance layer 103 and peak intensity I(003) of the (003) plane in the X-ray diffraction pattern may be greater than 20, for example (I(018)/I(003)>20). As a result, expansion/contraction in a plane which is parallel to the principal face of the positive-electrode active substance layer 103 can be reduced.

Figure 2:
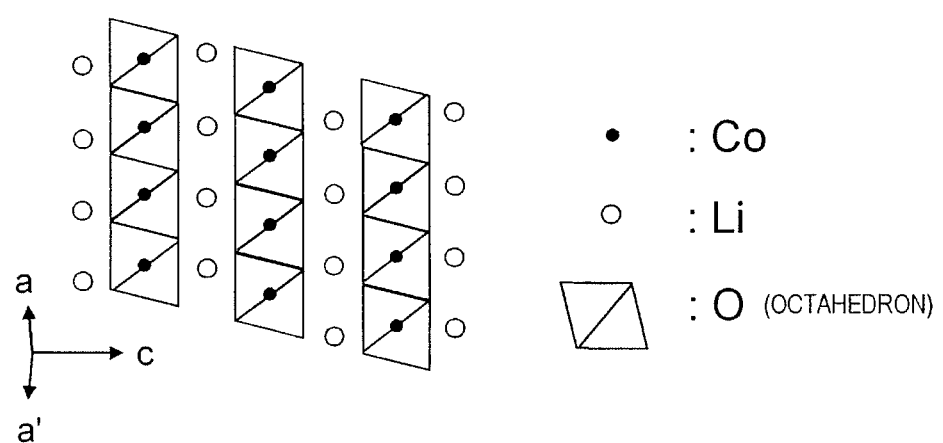
FIG. 2 is a schematic diagram showing a relationship between the crystal structure of lithium cobaltate and the crystal axis.

FIG. 2 schematically shows the crystal structure of lithium cobaltate. In FIG. 2, each black circle represents a cobalt (Co), each white circle represents a lithium (Li), and each octahedron depicts oxygens (O) located at the respective apices of the octahedron. Layers of cobalt oxide, each including a two-dimensional array of octahedrons of oxygens with a cobalt in the center, and layers of lithiums, are alternately stacked. The $\alpha$-$NaFeO_2$ type crystal structure is a hexagonal system where, given a c axis which is the direction in which cobalt oxide layers and Li layers are stacked, an a axis and an a' axis constituting an angle of 120° with the a axis can be defined within the plane in which each cobalt oxide layer or each Li layer expands. Given an aa' plane that contains the a axis and the a' axis, lithium migrates or diffuses in the aa' plane within the crystal structure of lithium cobaltate.

As shown in FIG. 1, the z axis is defined in a direction perpendicular to the principal face 103c of the positive-electrode active substance layer 103, whereas the x axis and the y axis are defined in two directions which are parallel to the principal face 103c and perpendicular to the z axis, these two directions being orthogonal to each other.

In this case, the aa' plane and the z axis are parallel to each other in the first regions 103a oriented in the (110) plane. In the second regions 103b oriented in the (018) plane, the angle between the aa' plane and the z axis is 55°.

Figure 3A:
FIG. 3A shows directions of lithium insertion/release in the positive-electrode active substance layer according to the first embodiment.

FIG. 3A shows directions, indicated by arrows, in which lithium diffuses in the aa' plane in the positive-electrode active substance layer 103 of the all-solid lithium secondary battery 101 shown in FIG. 1. As shown in FIG. 2, in the positive-electrode active substance layer 103 oriented in the (018) plane, lithium ions migrate in a direction which is inclined by 55° from the normal of the principal face 103c (i.e., 35° from the principal face 103c). Thus, lithium ions are likely to migrate along the thickness direction of the positive-electrode active substance layer 103; since this reduces the lithium diffusion distance, it becomes possible to insert lithium ions or release inserted lithium ions in short periods of time. Since no crystal grain boundary exists along the thickness direction, it is unlikely for thickness-direction lithium diffusion to be hindered. In the positive-electrode active substance layer 103, the direction of lithium ion migration being inclined from the thickness direction makes for a longer diffusion distance than in, for example, any region that is oriented in the (110) plane. However, since the inclination is 55° from the normal of the principal face 103c, the diffusion distance is only about 1.7 times longer, which is not too long.

Furthermore, as will be described later, the solid electrolyte layer 104 is a region which is oriented in the (110) plane or the (102) plane, and has a crystal structure such that lithium is likely to diffuse along the thickness direction.

Therefore, in the positive-electrode active substance layer 103 and the solid electrolyte layer 104, it becomes easy to effect insertion/release of lithium ions to/from the lithium cobaltate, whereby the lithium secondary battery can attain high output power.

Figure 3B:
FIG. 3B shows directions of expansion/contraction in the positive-electrode active substance layer according to the first embodiment.

FIG. 3B shows directions of expansion/contraction in the positive-electrode active substance layer 103 due to charging and discharging. Since the positive-electrode active substance layer 103 is oriented in the (018) plane, the positive-electrode active substance layer 103 expands or contracts in a direction which is inclined by 35° from the normal of the principal face 103c (i.e., 55° from the principal face 103c), and hardly expands or contracts in a perpendicular direction thereto. As a result, expansion/contraction due to charging and discharging is suppressed in the xy plane. This reduces the decrease in adherence between the positive-electrode active substance layer 103 and the solid electrolyte layer 104 that is caused by expansion stress, thereby making the solid electrolyte layer 104 less likely to peel off the positive-electrode active substance layer 103. Thus, charge-discharge cycle characteristics can be enhanced.

(Solid Electrolyte Layer 104)

The solid electrolyte layer 104 is composed of lithium lanthanum titanate ($La_{2/3-x}Li_{3x}TiO_3$, $0<x<\frac{1}{6}$). Lithium lanthanum titanate has a tetragonal perovskite-type crystal structure. The solid electrolyte layer 104 may be an epitaxial film. For example, it may be a film which is epitaxially grown on the positive-electrode active substance layer 103. In this case, the solid electrolyte layer 104 will be an epitaxial film that matches the crystal orientation of the positive-electrode active substance layer 103. In other words, it will be an epitaxial film having a crystal orientation that reflects the crystal orientation of the positive-electrode active substance layer 103. It can be confirmed via X-ray diffraction or TEM that the solid electrolyte layer 104 is a film which has epitaxially grown on the positive-electrode active substance layer 103 as an underlayer. Note that the solid electrolyte layer 104 may contain impurities so long as it contains lithium lanthanum titanate of the above composition as the main component.

The solid electrolyte layer 104 is oriented in the (110) plane or the (102) plane with respect to the z axis. That is, the solid electrolyte layer 104 may be a crystalline region which is oriented in the (110) plane, or a crystalline region which is oriented in the (102) plane. Alternatively, these regions may be mixedly present. When the solid electrolyte layer 104 has such a crystal structure, it becomes possible to restrain grain boundaries from hindering lithium ion migration between the positive electrode 120 and the negative electrode 121, whereby lithium ion conductivity can be enhanced. Preferably, the solid electrolyte layer 104 is composed only of crystalline regions which are oriented in the (110) plane or the (102) plane. As a result, lithium-ion conductivity in the solid electrolyte layer 104 can be more effectively enhanced.

The x value in the composition of lithium lanthanum titanate ($La_{2/3-x}Li_{3x}TiO_3$) is, for example, greater than 0.09 but less than 1/6 (or 0.167)(0.09<x<0.167). More preferably, it is greater than 0.10 but less than 0.12 (0.10<x<0.12). When the x value is in such ranges, lithium-ion conductivity of the solid electrolyte layer 104 can be more enhanced.

The composition of lithium lanthanum titanate is not limited to the aforementioned composition. It suffices if it has a tetragonal perovskite-type crystal structure and is capable of lithium insertion and release. For example, some of the metallic elements contained in the composition may be substituted by minute amounts of other metallic elements.

(Positive-Electrode Current Collector 102)

The positive-electrode current collector 102 is composed of an electron conductor which does not cause any chemical reaction with the ion conductor within the bounds of the designed applied voltage for the lithium secondary battery 101. For example, the positive-electrode current collector 102 is composed of stainless steel, aluminum, an aluminum alloy, platinum, gold, titanium, or the like. In particular, from the standpoint of electrical conductivity, resistance against the ion conductor, oxidation-reduction potential, etc., aluminum, an aluminum alloy, platinum, or gold may be selected.

In the case where the positive-electrode active substance layer 103 is epitaxially grown on the positive-electrode current collector 102, a material on which a positive-electrode active substance of the desired orientation can be grown is to be used. For example, $SrTiO_3$ (STO) to which electrical conductivity is conferred through La or Nb doping, Pt or other metals epitaxially grown on an MgO substrate or an Si substrate, or the like can be used. Moreover, the positive-electrode active substance layer 103 may be formed on a substrate which permits epitaxial growth thereof, and the positive-electrode active substance layer 103 may be peeled off the substrate and then placed on a positive-electrode current collector 102 which is composed of a material such as stainless steel or aluminum.

(Negative-Electrode Active Substance Layer 105)

The negative-electrode active substance layer 105 contains a negative-electrode active substance which is composed of a compound capable of occluding and releasing lithium ions, e.g., a lithium alloy, an alloy, an intermetallic compound, carbon, an organic compound, an inorganic compound, a metal complex, or an organic polymer compound. These may be used each alone, or two or more such compounds may be used in combination. In addition to the active substance, the negative-electrode active substance layer 105 may contain an electrical conductivity aid, a binder, or the like. The negative-electrode active substance layer 105 may be an epitaxial film which is grown on the negative-electrode current collector 106 or the solid electrolyte layer 104.

(Negative-Electrode Current Collector 106)

The negative-electrode current collector 106 is composed of an electron conductor which does not cause any chemical reaction with the lithium ion-conductive electrolyte within the bounds of the applied voltage for the battery constructed. For example, stainless steel, nickel, copper, titanium, platinum, gold, or the like can be used. In particular, from the standpoint of electrical conductivity, resistance against the ion conductor, oxidation-reduction potential, etc., aluminum, an aluminum alloy, platinum, or gold may be selected. When the negative-electrode active substance layer 105 is epitaxially grown on the negative-electrode current collector 106, STO which has been doped with Nb or La may be used as the material of the negative-electrode current collector 106, for example.

In the all-solid lithium secondary battery of the present embodiment, the positive-electrode active substance layer 103 is oriented in the (018) plane. As a result, the expansion stress in the active substance within the xy plane is made smaller than in the case where the positive-electrode active substance layer 103 is oriented in the (110) plane, as has been described with reference to FIG. 3B. Therefore, the solid electrolyte layer 104 is restrained from peeling off the positive-electrode active substance layer 103, whereby charge-discharge cycle characteristics can be improved. Moreover, since the positive-electrode active substance layer 103 and the solid electrolyte layer 104 have a crystal structure which does not hinder lithium ion migration between the positive electrode 120 and the negative electrode 121, output characteristics can be enhanced. Thus, it is possible to realize good charge-discharge cycle characteristics while ensuring high output power.

The solid electrolyte layer 104 may be an epitaxial film which is grown on the positive-electrode active substance layer 103 as an underlayer. Although the solid electrolyte layer 104 has different Miller indices from those of the positive-electrode active substance layer 103, it epitaxially grows on the positive-electrode active substance layer 103; therefore, a solid electrolyte layer 104 which is controlled in a desired orientation can be obtained through simple production steps.

(Production Method for the all-Solid Lithium Secondary Battery 101)

Hereinafter, with reference to FIGS. 4A to 4D, a method for producing the all-solid lithium secondary battery 101 of the present embodiment will be described.

Figure 4A:
FIGS. 4A, 4B, 4C, and 4D are step-by-step cross-sectional views showing an exemplary production method for the all-solid lithium secondary battery according to the first embodiment.

First, as shown in FIG. 4A, an $SrTiO_3$ substrate doped with La is provided as the positive-electrode current collector 102. On the surface of the positive-electrode current collector 102, a positive-electrode active substance layer 103 of lithium cobaltate is formed by a sputter deposition technique, a vacuum evaporation technique, a chemical vapor deposition (CVD) technique, a pulse laser deposition technique (hereinafter PLD), or a sol-gel technique. The positive-electrode active substance layer 103 is formed under conditions that provide a crystal structure oriented in the (018) plane.

The conditions for forming the positive-electrode active substance layer 103, in particular the conditions for controlling crystal orientations, may differ depending on the formation method for the positive-electrode active substance layer 103, and may be set as appropriate. Regardless of which formation method is used, the conditions for obtaining desired oriented regions may be found in advance by trying film formation while varying a number of parameters.

Figure 4B:
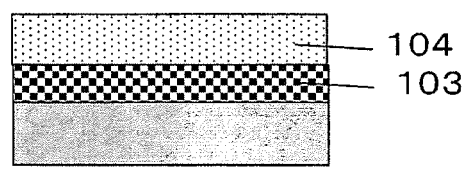

Next, as shown in FIG. 4B, a solid electrolyte layer 104 is formed on the positive-electrode active substance layer 103. Formation of the solid electrolyte layer 104 can be conducted by a sputter deposition technique, a vacuum evaporation technique, a CVD technique, PLD, a sol-gel technique, or the like, for example.

Figure 4C:
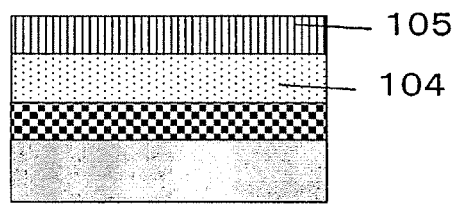

Next, as shown in FIG. 4C, a negative-electrode active substance layer 105 is formed on the solid electrolyte layer 104. Formation of the negative-electrode active substance layer 105 can be conducted by a sputter deposition technique, a vacuum evaporation technique, a CVD technique, a CVD technique, PLD, a sol-gel technique, or the like.

Figure 4D:
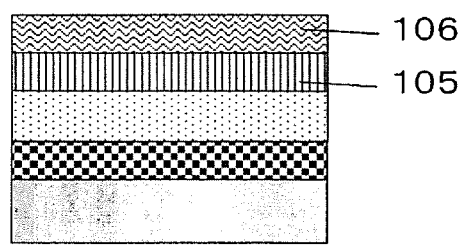

Thereafter, as shown in FIG. 4D, a negative-electrode current collector 106 is formed on the negative-electrode active substance layer 105. Formation of the negative-electrode current collector 106 can be conducted by a sputter deposition technique, a vacuum evaporation technique, a CVD technique, PLD, a sol-gel technique, or the like. Alternatively, a metal foil may be disposed as a negative-electrode current collector 106 on the negative-electrode active substance layer 105. In this manner, the all-solid lithium secondary battery 101 is produced.

The all-solid lithium secondary battery 101 of the present embodiment may be produced by, for example, epitaxially growing the positive-electrode active substance layer 103, the solid electrolyte layer 104, and the negative-electrode active substance layer 105 in this order on the positive-electrode current collector 102.

The production method for the all-solid lithium secondary battery 101 is not limited to the aforementioned method. The aforementioned method forms the positive-electrode active substance layer 103, the solid electrolyte layer 104, the negative-electrode active substance layer 105, and the negative-electrode current collector 106 in this order on the positive-electrode current collector 102; conversely, the negative-electrode active substance layer 105, the solid electrolyte layer 104, the positive-electrode active substance layer 103, and the positive-electrode current collector 102 may be formed in this order on the negative-electrode current collector 106. For example, the negative-electrode active substance layer 105, the solid electrolyte layer 104, and the positive-electrode active substance layer 103 may be epitaxially grown on the negative-electrode current collector 106 in this order.

Second Embodiment

Hereinafter, a second embodiment of an all-solid lithium secondary battery according to the present disclosure will be described.

The all-solid lithium secondary battery 201 according to the present embodiment differs from the all-solid lithium secondary battery 101 shown in FIG. 1 with respect to the construction of the positive-electrode active substance layer 103. Specifically, the positive-electrode active substance layer 103 according to the present embodiment includes a crystalline region (first region) which is oriented in the (018) plane and a crystalline region (second region) which is oriented in the (011) plane. Other construction is the same as in the all-solid lithium secondary battery 101 (FIG. 1), and the descriptions thereof will be omitted.

Figure 5:
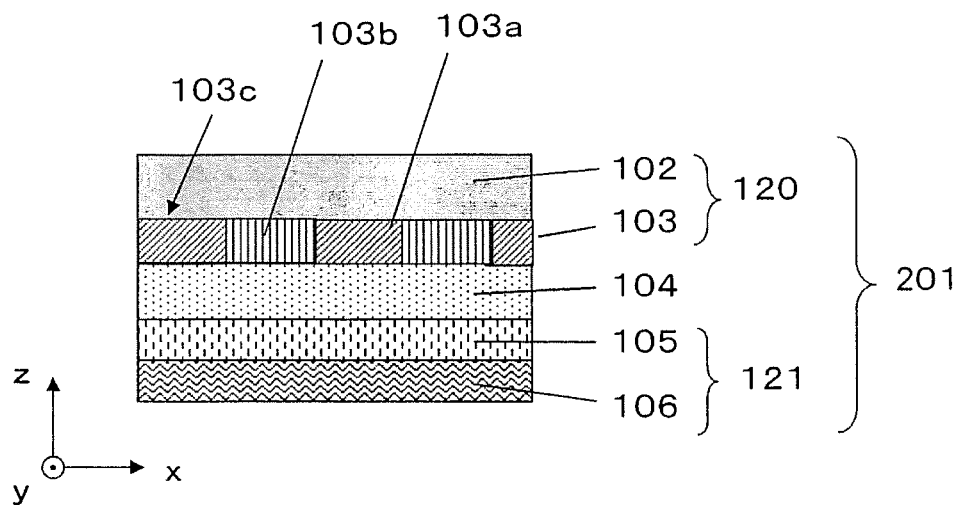
FIG. 5 is a cross-sectional view illustrating an exemplary second embodiment of an all-solid lithium secondary battery according to the present disclosure.

FIG. 5 is a schematic cross-sectional view illustrating another exemplary all-solid lithium secondary battery 201 according to the present embodiment.

As shown in FIG. 5, the positive-electrode active substance layer 103 includes a plurality of first regions 103a and a plurality of second regions 103b. The first regions 103a are crystalline regions which are oriented in the (110) plane with respect to the z axis direction, whereas the second regions 103b are crystalline regions which are oriented in the (018) plane with respect to the z axis direction. The positive-electrode active substance layer 103 only includes the first regions 103a and the second regions 103b. As used herein, to "only include the first regions 103a and the second regions 103b" means that, when the positive-electrode active substance layer 103 is subjected to X-ray diffraction intensity measurement, an integral value of a total of the peaks associated with any crystal which is oriented in the (110) plane and the peaks associated with any crystal oriented in the (018) plane accounts for 95% or more of an integral value of all diffraction peaks.

Within each first region 103a and each second region 103b, the positive-electrode active substance is a substantially single crystal. Although a plurality of single-crystalline regions exist in the positive-electrode active substance layer 103, the orientation of each single crystal is (110) or (018), rather than being random. In this respect, it can be said that the positive-electrode active substance layer 103 is not polycrystalline.

The ratio (I(110)/I(018)) between peak intensity I(110) of the (110) plane and peak intensity I(018) of the (018) plane in the positive-electrode active substance layer 103 may satisfy the relationship $0.3 \leq I(110)/I(018) \leq 1$, for example. If this ratio is less than 0.3, the proportion of the regions which are oriented in the (110) plane in the positive-electrode active substance layer 103 will become smaller, so that adequate output characteristics may not be obtained. If this ratio is equal to or greater than 1, an adequate effect of suppressing expansion/contraction of the positive-electrode active substance layer 103, as described below, may not be obtained.

The plurality of first regions 103a and the plurality of second regions 103b are mixedly present in the xy plane which is perpendicular to the z axis (i.e., a plane which is parallel to the principal face 103c). As shown in FIG. 5, the first regions 103a and the second regions 103b may be disposed so as to have no overlap along the z axis direction. Since no crystal grain boundaries exist along the z axis direction in such a construction, lithium is likely to diffuse along the z axis direction. The layout of the first regions 103a and the second regions 103b can be confirmed via TEM observation of a cross section of the positive-electrode active substance layer 103.

As has been described earlier with reference to FIG. 2, in the crystal structure of lithium cobaltate, lithium will migrate or diffuse within the aa' plane. The aa' plane and the z axis are parallel to each other in the first regions 103a oriented in the (110) plane. In the second regions 103b oriented in the (018) plane, the angle between the aa' plane and the z axis is 55°.

Figure 6A:
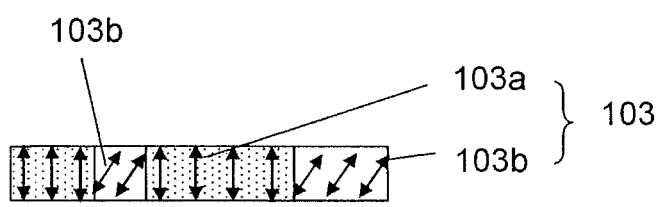
FIG. 6A shows directions of lithium insertion/release in the positive-electrode active substance layer according to the second embodiment.

FIG. 6A shows directions, indicated by arrows, in which lithium diffuses in the aa' plane in the positive-electrode active substance layer 103. As shown in FIG. 6A, in the first regions 103a the oriented in the (110) plane, lithium ions migrate in a direction perpendicular to the principal face 103c of the positive-electrode active substance layer 103 (the z axis direction), that is, along the thickness direction of the positive-electrode active substance layer 103. Moreover, in the second regions 103b oriented in the (018) plane, lithium ions migrate in a direction which is inclined by 55° from the normal of the principal face 103c (i.e., 35° from the principal face 103c). Thus, in the first regions 103a, lithium ions are likely to migrate along the thickness direction of the positive-electrode active substance layer 103; since this reduces the lithium diffusion distance, it becomes possible to insert lithium ions or release inserted lithium ions in short periods of time. In the second regions 103b, as has been described with reference to FIG. 3A, the direction of lithium ion migration is inclined from the thickness direction, but the diffusion distance is only about 1.7 times longer, which is not too long. Moreover, in both the first regions 103a and the second regions 103b, since no crystal grain boundary exists along the thickness direction, it is unlikely for thickness-direction lithium diffusion to be hindered.

Furthermore, as will be described later, the solid electrolyte layer 104 is a region which is oriented in the (110) plane or the (102) plane, and has a crystal structure such that lithium is likely to diffuse along the thickness direction.

Therefore, in the entire positive-electrode active substance layer 103 and the solid electrolyte layer 104, it becomes easy to effect insertion/release of lithium ions to/from the lithium cobaltate, whereby the lithium secondary battery can attain high output power.

Figure 6B:
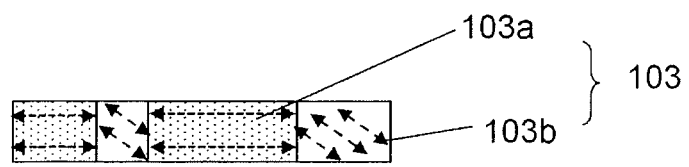
FIG. 6B shows directions of expansion/contraction in the positive-electrode active substance layer according to the second embodiment.

FIG. 6B shows directions of expansion/contraction in the positive-electrode active substance layer 103 due to charging and discharging. As shown in FIG. 6B, in the first regions 103a, the positive-electrode active substance layer expands or contracts in a direction parallel to the principal face 103c of the positive-electrode active substance layer 103, and hardly expands or contracts in a perpendicular direction thereto. Moreover, in the second regions 103b oriented in the (018) plane, the positive-electrode active substance layer 103 expands or contracts in a direction which is inclined by 35° from the normal of the principal face 103c (i.e., 55° from the principal face 103c), and hardly expands or contracts in a perpendicular direction thereto. The directions of expansion/contraction in these two regions are essentially orthogonal. Therefore, the second regions 103b suppress expansion of the first regions 103a, while the first regions 103a suppress expansion of the second regions 103b. Thus, in the entire positive-electrode active substance layer 103, expansion/contraction due to charging and discharging is better suppressed than in the case where it is composed only of a region which is oriented in the (110) plane or the (018) plane. As a result of this, the solid electrolyte layer 104 is less likely to peel off the positive-electrode active substance layer 103. Thus, deteriorations in charge-discharge cycle characteristics due to peeling of the solid electrolyte layer 104 can be suppressed.

In the all-solid lithium secondary battery 201 of the present embodiment, the positive-electrode active substance layer 103 is composed only of the first regions 103a and the second regions 103b having different directions of expansion/contraction. Thus, as has been described with reference to FIG. 6B, expansion occurring in the regions 103a and expansion the regions 103b suppress each other. As a result, peeling of the solid electrolyte layer 104 due to expansion stress in the active substance can be suppressed, whereby charge-discharge cycle characteristics are improved.

The present embodiment utilizes mutual expansion suppression between two regions with different directions of expansion/contraction, and thus allows the cycle characteristics to be more effectively controlled than in the lithium secondary battery 101 according to the first embodiment.

Moreover, since the positive-electrode active substance layer 103 and the solid electrolyte layer 104 have crystal structures which do not hinder lithium ion migration between the positive electrode 120 and the negative electrode 121, it is possible to enhance output characteristics. In particular, the positive-electrode active substance layer 103 includes regions that are oriented in the (110) plane, in which the diffusion distance of lithium is shorter, and thus can realize higher output power than in the case where the positive-electrode active substance layer 103 is composed only of regions which are oriented in the (018) plane.

Next, a method of forming the positive-electrode active substance layer 103 in the all-solid lithium secondary battery 201 of the present embodiment will be described. The formation methods for the other layers are similar to the methods described above with reference to FIG. 4, and their descriptions will be omitted.

On the surface of the positive-electrode current collector 102, a positive-electrode active substance layer 103 of lithium cobaltate is formed by a sputter deposition technique, a vacuum evaporation technique, a chemical vapor deposition (CVD) technique, a pulse laser deposition technique (hereinafter PLD), or a sol-gel technique. The positive-electrode active substance layer 103 is formed under conditions such that the first regions 103a the oriented in the (110) plane and the second regions 103b oriented in the (018) plane are mixedly present in the xy plane.

The conditions for forming the positive-electrode active substance layer 103, in particular the conditions for controlling crystal orientations, may differ depending on the formation method for these layers, and may be set as appropriate. Regardless of which formation method is used, the conditions for obtaining desired oriented regions may be found in advance by trying film formation while varying a number of parameters. As one instance, when epitaxially growing the positive-electrode active substance layer 103 by PLD, no straightforward control parameters for controlling the mixing ratio between the regions oriented in the (110) plane and the regions oriented in the (018) plane were found through the inventors' studies. However, an overall tendency was observed that, as the energy of adsorbed atoms on the epitaxial growth surface increased, the proportion of the regions oriented in the (110) plane increased. Note that the aforementioned energy can be adjusted via a number of parameters, e.g., laser pulse energy, pulse frequency, and substrate temperature.

In the positive-electrode active substance layer 103, the first regions 103a and the second regions 103b may have overlaps along the thickness direction. In this case, crystal grain boundaries will be created along the thickness direction, so that the high output power characteristics of the lithium secondary battery may somewhat be deteriorated. However, since the positive-electrode active substance layer 103 only includes the first regions 103a the oriented in the (110) plane and the second regions 103b oriented in the (018) plane, expansion/contraction is suppressed across the entire positive-electrode active substance layer 103, whereby similar effects to those of the aforementioned embodiment can be obtained. In other words, while ensuring high output power, peeling of the solid electrolyte layer 104 can be suppressed, and charge-discharge cycle characteristics can be enhanced.

Note that epitaxial growth of a solid electrolyte layer 104 which is oriented in the (110) plane is also possible when the first regions 103a and the second regions 103b of the positive-electrode active substance layer 103 according to the present embodiment are adopted as an underlayer.

EXAMPLES

Results of producing lithium secondary batteries according to the embodiment, and measuring their characteristics and the like, will now be described.

Example 1

Battery Production

According to the procedure shown in FIGS. 4A to 4D, a lithium secondary battery according to Example 1 was produced.

First, as shown in FIG. 4A, as a positive-electrode current collector 102, an STO substrate doped with La (10 mm×10 mm, thickness: 500 μm), with a single-crystalline (110) plane, was provided. On the surface of the positive-electrode current collector 102, a positive-electrode active substance layer 103 of lithium cobaltate was formed by using PLD. As the target, a sintered oxide target containing Li and Co at a ratio of Li:Co=1.3:1 was used. The film formation conditions by PLD were as follows.
laser pulse energy: 180 mJ
pulse frequency: 5 Hz
oxygen partial pressure: 8 Pa
substrate temperature: 500° C.
distance between the target and the substrate: 40 mm The thickness of the resultant positive-electrode active substance layer 103 was 800 nm.

Next, as shown in FIG. 4B, a solid electrolyte layer 104 of lithium lanthanum titanate was formed on the surface of the positive-electrode active substance layer 103 by PLD. As the target, a sintered oxide target containing Li, La, and Ti at a ratio of Li:La:Ti=1.4:1:2 was used. The film formation conditions by PLD were as follows.
laser pulse energy: 250 mJ
pulse frequency: 1 Hz
oxygen partial pressure: 3 Pa
substrate temperature: 700° C.
distance between the target and the substrate: 40 mm The thickness of the resultant solid electrolyte layer 104 was 120 nm.

Next, as shown in FIG. 4C, a negative-electrode active substance layer 105 of indium was formed on the solid electrolyte layer 104 by a sputtering technique. The thickness of the resultant negative-electrode active substance layer 105 was 200 nm.

Thereafter, as shown in FIG. 4D, on the negative-electrode active substance layer 105, a negative-electrode current collector 106 of platinum was formed by a sputtering technique. The thickness of the resultant negative-electrode current collector 106 was 100 nm. In this manner, the all-solid lithium secondary battery (hereinafter abbreviated as simply "battery") of Example 1 was completed.

Battery Evaluation

Next, characteristics of the battery of Example 1 produced by the above method were evaluated.

A potentiostat was connected to the positive-electrode current collector 102 and the negative-electrode current collector 106, and a discharge capacity after a constant low current (CC) charging to 4.2 V at 60 μA, followed by a discharging down to 3.0 V, was defined as 1C. The 2C/1C capacity ratio was 0.57. Furthermore, one cycle was defined as involving a CC charging up to 4.2 V and a discharging down to 3.0 V; then, an increase rate from a 100 Hz AC resistance value after 1 cycle to a resistance value after 10 cycles (resistance value at the $10^{th}$ cycle/resistance value at the $1^{st}$ cycle) was measured. The increase rate was found to be 1.78. Observation upon disassembly after 10 cycles showed no peeling of the solid electrolyte layer 104.

Figure 7:
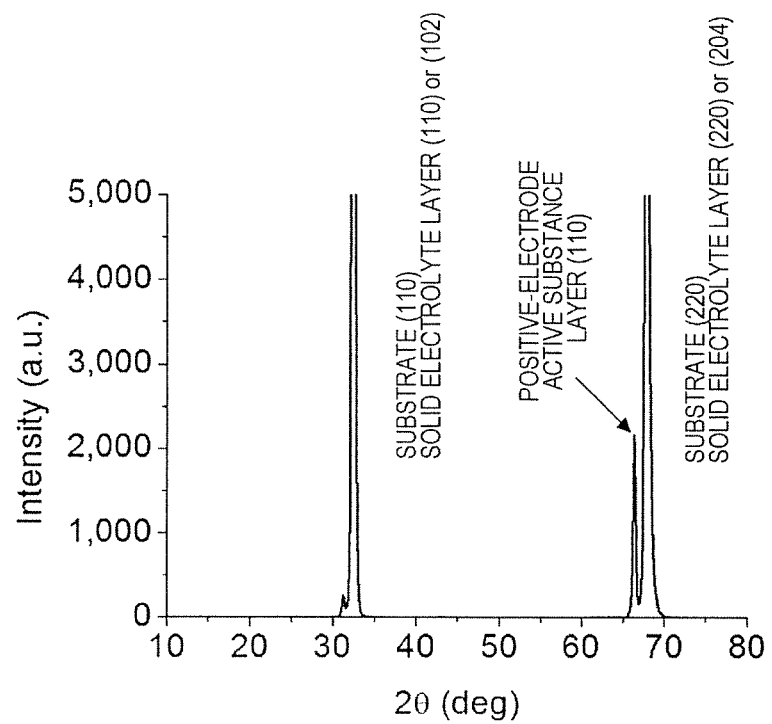
FIG. 7 is a diagram showing X-ray diffraction patterns according to Example 1.

Moreover, by using an X-ray diffraction apparatus (X'Pert MRD manufactured by Philips), the crystal structures of the positive-electrode active substance layer 103 and the solid electrolyte layer 104 when discharged were examined. FIG. 7 is a diagram showing the resultant X-ray diffraction pattern.

It was found from these results that, in the positive-electrode active substance layer 103, peak intensities other than that of the (018) plane were very small. For example, the peak intensity of the (003) plane was ½0 or less of the peak intensity of the (018) plane.

On the other hand, in the solid electrolyte layer 104, no peaks other than integer multiples of the (110) plane peak and integer multiples of the (102) plane peak were observed. The crystal lattice along the a axis and the crystal lattice along the c axis of lithium lanthanum titanate were measured to be, respectively, 3.88 Å and 7.75 Å.

Figure 8A:
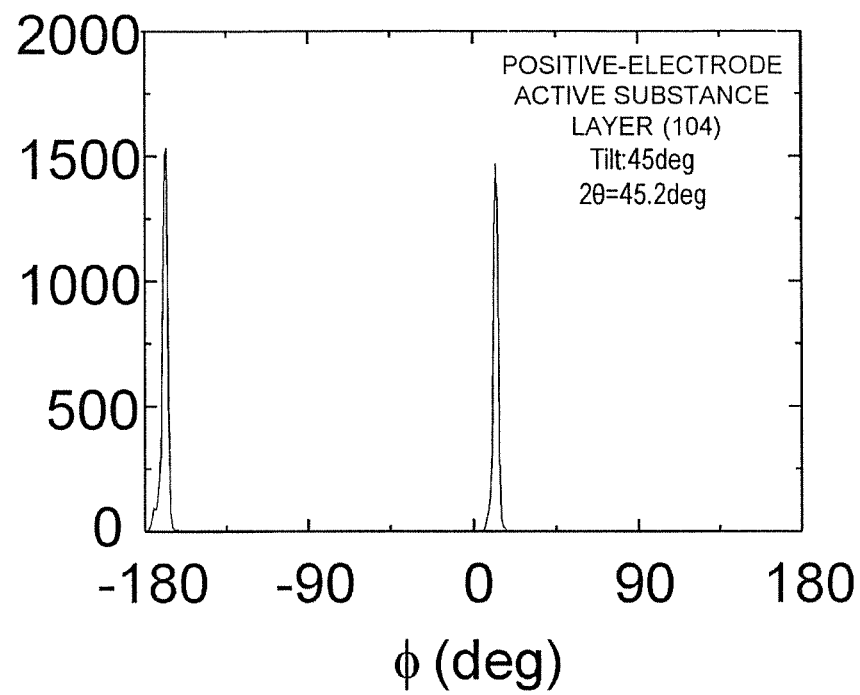
FIGS. 8A and 8B are diagrams showing X-ray diffraction patterns (Φ scans) according to Example 1.
Figure 8B:
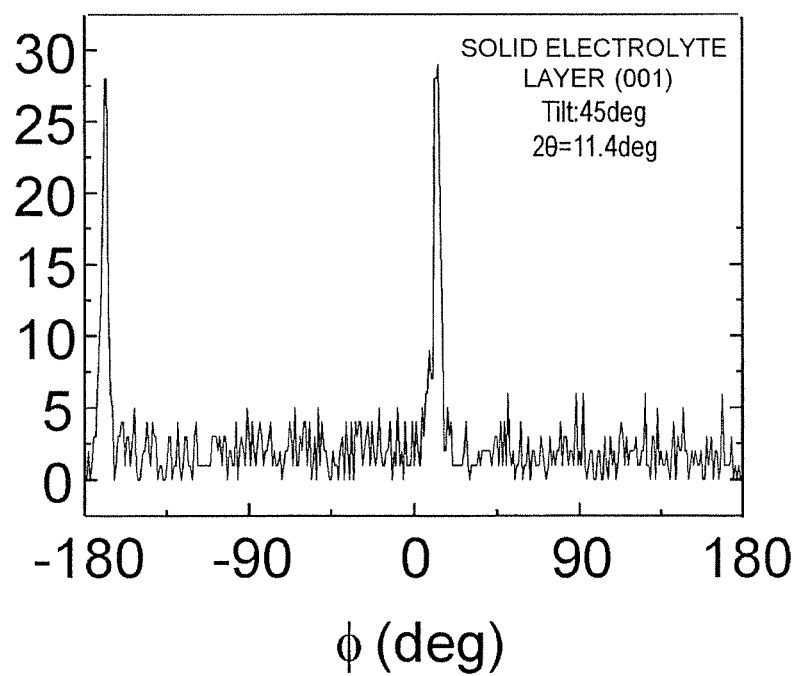

Then, a φ-scan by X-ray diffractometry was conducted. FIGS. 8A and 8B are diagrams showing φ-scan patterns in X-ray diffractometry for, respectively, the positive-electrode active substance layer and the solid electrolyte layer. From the φ-scan results, it was confirmed that the positive-electrode active substance layer 103 and the solid electrolyte layer 104 both had the same two-fold symmetry as that of the substrate, indicative of the fact that the layers 103 and 104 were epitaxial films.

Furthermore, while varying the elevation angle and the azimuth angle of the specimen, X-ray diffraction peak intensity measurements of the (003) plane, the (104) plane, and the (113) plane were taken (i.e., Pole-Figure method; for example, Non-Patent Document 1 discloses a Pole-Figure pattern of the (003) plane of a lithium cobaltate film which is oriented in the (018) plane). Crystal orientations along directions in the xy plane were derived from the Pole-Figure pattern, which revealed that the [−4-81] direction in the positive-electrode active substance layer 103 was parallel to the [001] direction or the [010] direction in the solid electrolyte layer 104, and that the [100] direction in the positive-electrode active substance layer 103 was parallel to the [1-10] direction or the [−201] direction in the solid electrolyte layer 104.

Moreover, by using an inductively coupled plasma-atomic emission spectrometer (an ICP analyzer designated SPS1700VR, manufactured by Hitachi High-Tech Science Corporation), the compositions of the positive-electrode active substance layer 103 and the solid electrolyte layer 104 were evaluated. This found that: Li:Co=1:1.0 in the positive-electrode active substance layer 103; and La:Li:Ti=0.56:0.31:1 in the solid electrolyte layer 104.

Example 2

A battery according to Example 2 was produced by a similar method to Example 1, except that the conditions for forming that positive-electrode active substance layer 103 were changed. In Example 2, a target containing Li and Co at the same composition ratio as in Example 1 was used. The film formation conditions by PLD were as follows.
laser pulse energy: 80 mJ
pulse frequency: 5 Hz
oxygen partial pressure: 10 Pa
substrate temperature: 470° C.
distance between the target and the substrate: 40 mm The thickness of the resultant positive-electrode active substance layer 103 was 800 nm.

Characteristics of the battery of Example 2 were evaluated, which revealed: the 2C/1C capacity ratio was 0.59; and the increase rate in resistance value after 10 cycles was 1.60. Observation upon disassembly after 10 cycles showed no peeling of the solid electrolyte layer 104.

X-ray diffractometry showed that the peak intensity ratio (110)/(018) between the (110) plane and the (018) plane in the positive-electrode active substance layer 103 was 1.0. Peak intensities other than those of the (018) plane and the (110) plane, e.g., those of the (003) plane and the (104) plane, were very small; that is, the peak intensity of the (003) plane, for example, was 1/20 or less of a sum of the peak intensities of the (110) plane and the (018) plane.

A ratio c(110)/c(018) between the length in the c axis direction of the regions oriented in the (110) plane and the length of the c axis direction of the regions oriented in the (018) plane in the positive-electrode active substance layer 103 in a discharged state was measured to be 0.95.

In the solid electrolyte layer 104, no peaks other than integer multiples of the (110) plane peak and integer multiples of the (102) plane peak were observed.

Next, through TEM observation of a cross section of positive-electrode active substance layer 103, it was confirmed that the positive-electrode active substance layer 103 was composed of two kinds of regions having different crystal orientations.

Then, a φ-scan by X-ray diffractometry was conducted, which revealed that regions oriented in the (110) plane and regions oriented in the (018) plane of the positive-electrode active substance layer 103 and the solid electrolyte layer 104 both had the same two-fold symmetry as that of the substrate, indicative of the fact that the layers 103 and 104 were epitaxial films.

Example 3

A battery according to Example 3 was produced by a similar method to Example 1, except that the conditions for forming the positive-electrode active substance layer 103 were changed. In Example 3, a target containing Li and Co at the same composition ratio as in Example 1 was used. The film formation conditions by PLD were as follows.

laser pulse energy: 140 mJ
pulse frequency: 5 Hz
oxygen partial pressure: 7 Pa
substrate temperature: 450° C.
distance between the target and the substrate: 50 mm The thickness of the resultant positive-electrode active substance layer 103 was 800 nm.

Characteristics of the battery according to Example 3 were evaluated, which revealed: the 2C/1C capacity ratio was 0.60, and the increase rate in resistance value after 10 cycles was 1.53. Observation upon disassembly after 10 cycles showed no peeling of the solid electrolyte layer 104.

X-ray diffractometry showed that the peak intensity ratio (110)/(018) between the (110) plane and the (018) plane in the positive-electrode active substance layer 103 was 0.3. Peak intensities other than those of the (018) plane and the (110) plane, e.g., those of the (003) plane and the (104) plane, were very small; that is, the peak intensity of the (003) plane, for example, was 1/20 or less of a sum of the peak intensities of the (110) plane and the (018) plane.

A ratio c(110)/c(018) between the length of the c axis direction of the regions oriented in the (110) plane and the length of the c axis direction of the regions oriented in the (018) plane in the positive-electrode active substance layer 103 in a discharged state was measured to be 0.97.

In the solid electrolyte layer 104, no peaks other than integer multiples of the (110) plane peak and integer multiples of the (102) plane peak were observed.

Then, a φ-scan by X-ray diffractometry was conducted, which revealed that regions oriented in the (110) plane and regions oriented in the (018) plane of the positive-electrode active substance layer 103 and the solid electrolyte layer 104 both had the same two-fold symmetry as that of the substrate, indicative of the fact that the layers 103 and 104 were epitaxial films.

Comparative Example 1

A battery according to Comparative Example 1 was produced by a similar method to Example 1, except that the conditions for forming the positive-electrode active substance layer 103 were changed. In Comparative Example 1, a target containing Li and Co at a composition ratio of Li:Co=1.4:1 was used. The film formation conditions by PLD were as follows.

laser pulse energy: 50 mJ
pulse frequency: 2.5 Hz
oxygen partial pressure: 3 Pa
substrate temperature: 500° C.
distance between the target and the substrate: 55 mm The thickness of the resultant positive-electrode active substance layer 103 was 800 nm.

Characteristics of the battery of Comparative Example 1 were evaluated, which revealed: the 2C/1C capacity ratio was 0.55; and the increase rate in resistance value after 10 cycles was 3.19.

From X-ray diffractometry, no peak other than that of the (110) plane were observed in the positive-electrode active substance layer 103. In the solid electrolyte layer 104, no peaks other than integer multiples of the (110) plane peak and integer multiples of the (102) plane peak were observed.

Next, a φ-scan by X-ray diffractometry was conducted, which revealed that the positive-electrode active substance layer 103 and the solid electrolyte layer 104 both had the same two-fold symmetry as that of the substrate, indicative of being an epitaxial film.

By using ICP spectrometry, the compositions of the positive-electrode active substance layer 103 and the solid electrolyte layer 104 were evaluated, which revealed: Li:Co=1:0.99 in the positive-electrode active substance layer 103; and La:Li:Ti=0.56:0.33:1 in the solid electrolyte layer 104.

Comparative Example 2

A battery according to Comparative Example 2 was produced by a similar method to Example 1, except that the conditions for forming the positive-electrode active substance layer 103 and the solid electrolyte layer 104 were changed.

In Comparative Example 2, a target containing Li and Co at a composition ratio of Li:Co=1.4:1 was used. The film formation conditions by PLD were as follows.

laser pulse energy: 50 mJ
pulse frequency: 2.5 Hz
oxygen partial pressure: 3 Pa
substrate temperature: 500° C.
distance between the target and the substrate: 55 mm The thickness of the resultant positive-electrode active substance layer 103 was 800 nm.

The solid electrolyte layer 104 was formed by using a target of sintered oxide which contained Li, La, and Ti at the same composition ratio as in Example 1. The film formation conditions by PLD were as follows.
laser pulse energy: 100 mJ
pulse frequency: 5 Hz
oxygen partial pressure: 8 Pa
substrate temperature: 500° C.
distance between the target and the substrate: 40 mm The thickness of the resultant solid electrolyte layer 104 was 120 nm.

Characteristics of the battery of Comparative Example 2 were evaluated, which revealed: the 2C/1C capacity ratio was 0.42; and the increase rate in resistance value after 10 cycles was 2.30.

X-ray diffractometry showed no peak other than that of the (110) plane in the positive-electrode active substance layer 103. In the solid electrolyte layer 104, other than the peaks of the (110) plane and the (102) plane, peaks of the (001) plane, the (100) plane, the (200) plane, the (111) plane, and the (222) plane were also observed, indicative of being polycrystalline.

A φ-scan by X-ray diffractometry was conducted, which revealed that the positive-electrode active substance layer 103 had same two-fold symmetry as that of the substrate, indicative of being an epitaxial film. The solid electrolyte layer 104 exhibited no particular orientation.

Comparative Example 3

A battery according to Comparative Example 3 was produced by a similar method to Example 1, except that the PLD film formation conditions for the solid electrolyte layer 104 were set as follows.
laser pulse energy: 100 mJ
pulse frequency: 5 Hz
oxygen partial pressure: 8 Pa
substrate temperature: 500° C.
distance between the target and the substrate: 40 mm The thickness of the resultant solid electrolyte layer 104 was 120 nm.

Characteristics of the battery according to Comparative Example 3 were evaluated, which revealed: the 2C/1C capacity ratio was 0.38, and the increase rate in resistance value after 10 cycles was 1.70.

X-ray diffractometry showed no peak other than that of the (018) plane in the positive-electrode active substance layer 103. In the solid electrolyte layer 104, other than the peaks of the (110) plane and the (102) plane, peaks of the (001) plane, the (100) plane, the (200) plane, the (111) plane, and the (222) plane were also observed, indicative of being polycrystalline.

A φ-scan by X-ray diffractometry was conducted, which revealed that the positive-electrode active substance layer 103 had same two-fold symmetry as that of the substrate, indicative of being an epitaxial film. The solid electrolyte layer 104 exhibited no particular orientation.

(Results and Discussions)

The results of Examples 1 to 3 and Comparative Examples 1 to 3 above are shown in Table 1.

TABLE 1

| | orientation of positive-electrode active substance layer | diffraction peak intensity ratio I(110)/I(018) of positive-electrode active substance layer | c axis length ratio c(110)/c(018) of positive-electrode active substance layer | result of battery characteristics evaluation | | |
|---|---|---|---|---|---|---|
| | | | | orientation of solid electrolyte layer | capacity ratio 2C/1C | resistance increase rate $R_{10cycle}/R_{1cycle}$ |
| Example 1 | (018) | — (018) only | — | (110), (102) | 0.57 | 1.78 |
| Example 2 | (018) + (110) | 1.0 | 0.95 | (110), (102) | 0.59 | 1.60 |
| Example 3 | (018) + (110) | 0.3 | 0.97 | (110), (102) | 0.60 | 1.53 |
| Comparative Example 1 | (110) | — (110) only | — | (110), (102) | 0.55 | 3.19 |
| Comparative Example 2 | (110) | — (110) only | — | poly-crystalline | 0.42 | 2.30 |
| Comparative Example 3 | (018) | — (018) only | — | poly-crystalline | 0.38 | 1.70 |

The 2C/1C capacity ratio shown in Table 1 indicates changes in capacity when the rates of charging and discharging are increased. The higher this value is, the higher the output characteristics are. The resistance increase rate after 10 cycles to after 1 cycle indicates an increase rate in the resistance of the device through operation cycles of charging and discharging. The lower this value is, the better the cycle characteristics are.

The results of Table 1 indicate the following.

First, cycle characteristics of the batteries of Examples and Comparative Examples will be compared. In the batteries of Examples 1 to 3 and Comparative Example 3, the resistance increase rate after 10 cycles is smaller than those of the batteries of Comparative Examples 1 and 2, indicative of improved cycle characteristics. This is presumably because, in Examples 1 to 3, the positive-electrode active substance layer 103 includes regions which are oriented in the (018) plane, so that expansion/contraction of the active substance in the xy plane is suppressed, thereby reducing peeling of the solid electrolyte layer 104.

In Comparative Examples 1 and 2, on the other hand, the positive-electrode active substance layer 103 is a region oriented in the (110) plane, thus inducing a large expansion stress in the xy plane. Therefore, presumably, the strength of adherence between the positive-electrode active substance layer and the solid electrolyte layer was deteriorated, and peeling of the solid electrolyte layer occurred, thus resulting in the lower cycle characteristics.

In a comparison between the cycle characteristics of the batteries of Examples 1 to 3, the batteries of Examples 2 and 3 provide higher cycle characteristics than does the battery of Example 1. The presumable reason is as follows. In Examples 1 and 2, the positive-electrode active substance layer 103 is composed of second regions oriented in the (018) plane and first regions oriented in the (110) plane. Therefore, in addition to the effect of expansion suppression within the xy plane due to the inclusion of the second regions oriented in the (018) plane, there is also obtained an effect of expansion suppression between the first regions and the second regions, which have mutually different expansion directions, as has been described with reference to FIG. 6. Presumably as a result of this, expansion was further suppressed across the entire positive-electrode active substance layer 103.

Next, output characteristics of the batteries of Examples and Comparative Examples will be compared. It can be seen that the batteries of Examples 1 to 3 and Comparative Example 1 have higher 2C/1C capacity ratios than those of the batteries of Comparative Examples 2 and 3, indicative of high output characteristics. This is presumably because both the positive-electrode active substance layer 103 and the solid electrolyte layer 104 have crystal structures that are unlikely to hinder lithium ion migration. On the other hand, in Comparative Examples 2 and 3, the solid electrolyte layer 104 is polycrystalline; therefore, many crystal grain boundaries presumably exist in the z axis direction, along which lithium ions migrate. Thus, the rate of lithium diffusion decreased to result in the lower output characteristics.

Moreover, the batteries of Examples 2 and 3 have higher output characteristics than those of the battery of Example 1. This is presumably because, since the lithium ion conductivity along the z axis direction in the regions of the positive-electrode active substance layer 103 being oriented in the (110) plane is higher than that of the regions oriented in the (018) plane, the positive-electrode active substance layer 103 which includes not only regions oriented in the (018) plane but also regions oriented in the (110) plane (Examples 2 and 3) present lower resistance as to lithium ion conduction than does the positive-electrode active substance layer 103, which is composed of a region oriented in the (018) plane (Example 1).

It was also found that, in the case of forming a positive-electrode active substance layer including first and second regions as in Examples 2 and 3, the c axis of the first regions oriented in the (110) plane is shorter than the c axis of the second regions oriented in the (018) plane. Specifically, given a lattice constant c(110) of the c axis of the first regions and a lattice constant c(018) of the c axis of the second regions, there is a relationship of 0.95<c(110)/c(018)<0.99.

From these results, it was confirmed that the present embodiment can simultaneously achieve high output power and excellent cycle characteristics. It was also found that, when the positive-electrode active substance layer 103 is composed only of regions oriented in the (018) plane and regions oriented in the (110) plane (Examples 2 and 3), more effective improvements in output characteristics and cycle characteristics are attained than in the case where it is composed only of a region which is oriented in the (018) plane (Example 1).

The all-solid lithium secondary battery disclosed herein has high charge-discharge characteristics and reliability, and is useful as a main power supply for a mobile battened device, a main power supply for a power tool, and an industrial-use main power supply for an electric vehicle or the like.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An all-solid lithium secondary battery comprising:
    a positive electrode including a positive-electrode active substance layer;
    a negative electrode including a negative-electrode active substance layer, the negative-electrode active substance layer allowing lithium ions to be inserted and allowing inserted lithium ions to be released; and
    a solid electrolyte layer interposed between the positive electrode and the negative electrode, wherein,
    the positive-electrode active substance layer comprises lithium cobaltate, and has an $\alpha$-NaFeO$_2$ type crystal structure;
    the positive-electrode active substance layer has a (018) plane oriented in a normal direction of a principal face of the positive-electrode active substance layer;
    the solid electrolyte layer comprises lithium lanthanum titanate and has a tetragonal perovskite-type crystal structure; and
    the solid electrolyte layer has a (110) plane or a (102) plane oriented in a normal direction of a principal face of the solid electrolyte layer.

2. The all-solid lithium secondary battery of claim 1, wherein the positive-electrode active substance layer and the solid electrolyte layer are epitaxial films.

3. The all-solid lithium secondary battery of claim 2, wherein the solid electrolyte layer is an epitaxial film that matches a crystal orientation of the positive-electrode active substance layer.

4. The all-solid lithium secondary battery of claim 1, wherein a [−4-81] direction in the positive-electrode active substance layer is parallel to a [001] direction or a [010] direction in the solid electrolyte layer, and a [100] direction in the positive-electrode active substance layer is parallel to a [1-10] direction or a [−201] direction in the solid electrolyte layer.

5. The all-solid lithium secondary battery of claim 1, wherein, in an X-ray diffraction pattern of the positive-electrode active substance layer, a ratio (I(018)/I(003)) between a peak intensity I(018) of the (018) plane and a peak intensity I(003) of the (003) plane satisfies the relationship I(018)/I(003)>20.

6. An all-solid lithium secondary battery comprising:
    a positive electrode including a positive-electrode active substance layer;
    a negative electrode including a negative-electrode active substance layer, the negative-electrode active substance layer allowing lithium ions to be inserted and allowing inserted lithium ions to be released;
    a solid electrolyte layer interposed between the positive electrode and the negative electrode, wherein,
    the positive-electrode active substance layer comprises lithium cobaltate, and has an $\alpha$-NaFeO$_2$ type crystal structure;
    given an x axis and a y axis which are defined as two axes that are parallel to a principal face of the positive-electrode active substance layer, and a z axis which is defined as an axis that is perpendicular to the principal face,
    the positive-electrode active substance layer is composed only of first regions having a (110) plane oriented in the z axis direction and second regions having a (018)

plane oriented in the z axis direction, the first regions and second regions being mixedly present in an xy plane of the positive-electrode active substance layer;

the solid electrolyte layer comprises lithium lanthanum titanate and has a tetragonal perovskite-type crystal structure; and the solid electrolyte layer has a (110) plane or a (102) plane in a normal direction of a principal face of the solid electrolyte layer.

7. The all-solid lithium secondary battery of claim 6, wherein the positive-electrode active substance layer and the solid electrolyte layer are epitaxial films.

8. The all-solid lithium secondary battery of claim 7, wherein the solid electrolyte layer is an epitaxial film that matches a crystal orientation of the positive-electrode active substance layer.

9. The all-solid lithium secondary battery of claim 6, wherein, in an X-ray diffraction pattern of the positive-electrode active substance layer, a ratio (I(110)/I(018)) between a peak intensity I(110) of the (110) plane and a peak intensity I(018) of the (018) plane is 0.3 or 1.0.

10. The all-solid lithium secondary battery of claim 2, wherein the positive-electrode active substance layer is formed on a current collector which is a strontium titanate substrate, the strontium titanate substrate being doped with a dopant and electrically conductive.

11. The all-solid lithium secondary battery of claim 7, wherein the positive-electrode active substance layer is formed on a current collector which is a strontium titanate substrate, the strontium titanate substrate being doped with a dopant and electrically conductive.

* * * * *